United States Patent

Matsuura

[15] 3,694,869
[45] Oct. 3, 1972

[54] TUBE FASTENER

[72] Inventor: Norio Matsuura, 31 Owada-naka 1-chome, Nishiyodagawa-ku, Osaka, Japan

[22] Filed: Jan. 7, 1971

[21] Appl. No.: 104,633

[30] Foreign Application Priority Data

May 22, 1970   Japan ..................... 45/48486

[52] U.S. Cl. .................................. 24/278
[51] Int. Cl. .................................. B65d 63/06
[58] Field of Search .................. 24/278; 285/198

[56] References Cited

UNITED STATES PATENTS

| | | |
|---|---|---|
| 1,694,664 | 12/1928 | Parker ......................... 24/278 |
| 3,191,256 | 6/1965 | Müller-Neuhaus .......... 24/278 |

FOREIGN PATENTS OR APPLICATIONS 350,711   6/1931   Great Britain ............... 24/278

*Primary Examiner*—Donald A. Griffin
*Attorney*—James E. Armstrong and Ronald S. Cornell

[57] ABSTRACT

A fastener is provided with one or more flexible coiled bands, capable of surrounding a tube or pipe, whereby two or more pieces may be joined together. The band is associated with a body by fixing both ends of the band on opposite portions of the body, and a screw-tightener is provided to exert a downward force on, and to tighten the coiled band.

When the tube fastener is placed at the joining point of two pieces of flexible pipe or tubing, and when the tightener is manually operated, the coiled band is forced away from the supporting body and the diameter of the coil is reduced, so that the coiled band exerts a high pressure on the entire contacted portion of the tube along the whole circumference of the coil, thereby joining the two pieces of pipe securely so as to prevent leakage.

11 Claims, 8 Drawing Figures

3,694,869

INVENTOR
NORIO MATSUURA

BY Armstrong & Cornell
ATTORNEY

3,694,869

TUBE FASTENER

BACKGROUND OF THE INVENTION

At present flexible pipe or tubing is connected and fastened by conventional tube fasteners such as that of FIG. 8 to provide a tight joint and to prevent gas or liquid leakage.

Although a tube may be tightly fixed to a pipe with a manual turning of the screw, this fastener has several drawbacks.

The first drawback is the fact that this fastener cannot exert a high pressure along the whole circumference of the outer surface of the tube. Because the fastener is constructed with a U-shaped metal band and a screw shaft which pierces the both ends of the band, an opening between the two oppositely positioned walls of the band is naturally formed.

Therefore, even when the U-shaped metal band is squeezed and the diameter of the band is reduced as shown by the dotted line, at two points of the band, that is, at the opening and its antipodes there is no pressure exerted on the tube. Thus, complete prevention of the fluid or oil leakage cannot be achieved with the conventional tube fastener.

The other drawback is the inconveneient operation in adjusting the screw shaft. Because the screw shaft pierces the ends of the metal band in the tangential direction of tube, the space for turning the screw shaft is limited by the opposing walls. Also the shape of the turning knob must be carefully designed so as not to touch the wall of the U-shaped band.

The tube fastener of the invention eliminates these drawbacks of the conventional tube fastener.

SUMMARY OF THE INVENTION

The fastener of the invention is composed of at least one circularly coiled band having terminal end portions xtending beyond the coiled portion. A support or frame holds the extending terminal end positions in spaced apart relationship and pressure exerting means, projecting through or piercing the support, is positioned intermediate the end portions. The pressure exerting means is operatively associated with the coiled band to force the coil portion of the band away from the support by a downward force in a radial direction. The force or pressure thus exerted reduces the diameter of the band and the inner and outer tubes at the point of connection and both receive a high squeezing pressure along the entire circumference of the band.

As every part of the inner tube along the entire circumference of the band receives squeezing pressure, not only sufficient tightness but also complete prevention of the fluid or gas leakage can be accomplished.

Moreover, the pressure exerting means is provided on the supporting body in the radial direction of the tube. Therefore enough space for positioning a knob, and also for turning or adjusting can be achieved.

DETAILED DESCRIPTION

Figure 1:
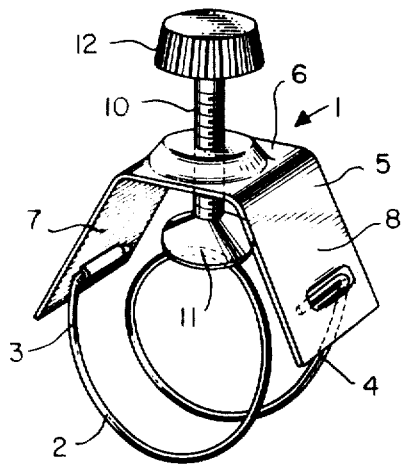
FIG. 1 is a perspective view of the fastener of the invention.

In FIG. 1, tube fastener 1 has helically coiled band having one or more coils which is made of a flexible wire. Ends 3, 4 of band 2 extend symmetrically upward to support 5. Support 5 is made of rigid metal plate 6, and both sides of plate 6 are bent downwardly, providing arms 7, 8 of support 5. At the edge of each arm the respective ends of bands 2 are fixed by appropriate securing means such as hooks or curls.

At the middle of supporting body 5 an aperture to permit the movement of the force-exerting means is provided. Through the aperture, a screw shaft 10 is inserted engaging with the inner thread of the aperture (see FIG. 3) and shaft 10 pierces support 5 in a radial direction of coiled band 2.

Figure 3:
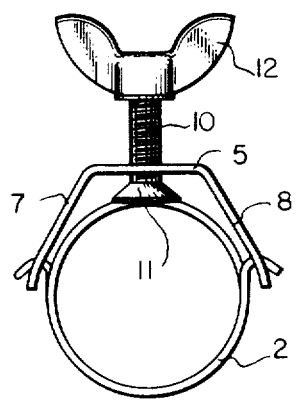
FIG. 3 is a front view of an embodiment of the fastener of the invention.
Figure 6:
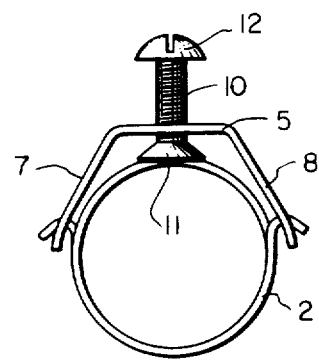
FIGS. 5 and 6 are front views of other embodiments of the invention.
Figure 5:
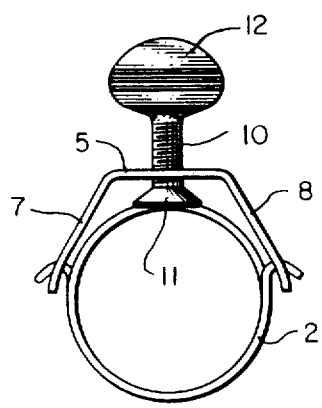
Figure 8:
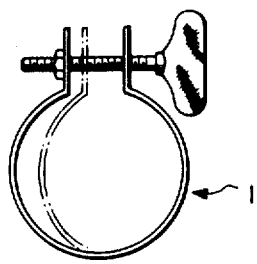
FIG. 8 is a front view of a conventional tube fastener (previously explained in the Background of the Invention).

At the pressure exerting end of shaft 10, a downwardly concaved pressure disc 11 is rotatably or fixedly provided. The concavity of disc 11 corresponds approximately with the convexity of the circumferential outer surface of band 2. When disc 11 contacts the coiled band both surfaces of disc 11 and band 2 fit together. Knob 12 for manual adjustment of the pressure exerted by shaft 10 is mounted at the opposite end of the shaft. The shape of knob 12 can be designed as required for the junction of the tubing. For example, in FIG. 1, knob 12 is a disc type designed for ordinary use. In FIG. 3, knob 12 is a wing type, which provides for easier turning. In FIG. 5 knob 12 is a disc plate type for safe operation. In FIG. 6, knob 12 is a screw-nut head, which can engage with the tip of a screw driver.

Figure 7:
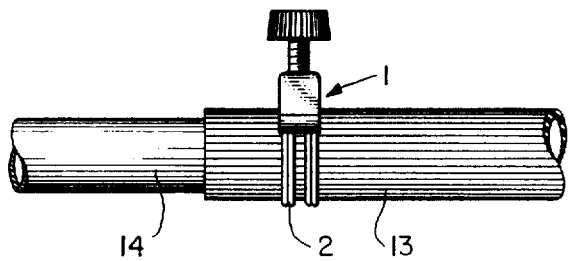
FIG. 7 is a side view of the fastener of the invention showing the joint of an inner and outer tube, pipe, or base.
Figure 2:
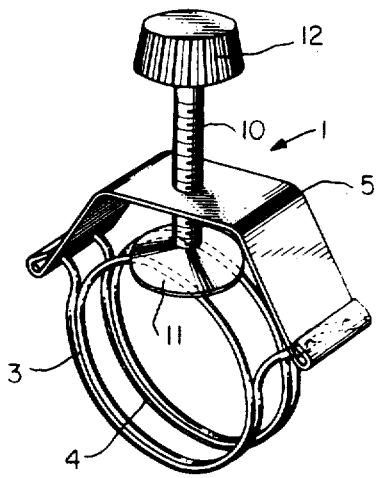
FIG. 2 is a perspective view of another embodiment of the fastener of the invention.
Figure 4:
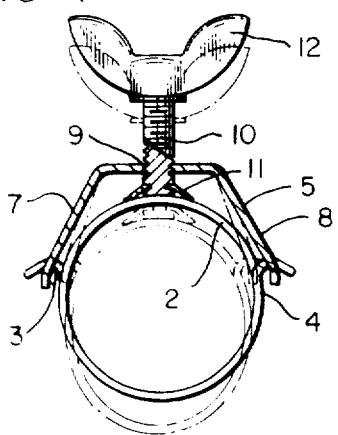
FIG. 4 is a sectional view of the FIG. 3.

FIG. 2 shows another embodiment, in which two coiled bands are coaxially arranged to provide stability and the ends of the both bands are respectively fixed to the arms 7, 8 of support 5 in the same manner as described as in the case of a single coiled band. In FIG. 4 and FIG. 7 the use of tube fastener 1 and the principle of its operation are illustrated. To apply the fastener at the junction of two pieces of tubing where an inner tube is inserted within an outer tube, screw shaft 10 should be first turned in a reverse direction from that of its thread to retract pressure-exerting disc 11 from its extended position, thus increasing the diameter of the coiled band. After fitting band 2 to the end of outer tube 13, inner tube 14 is inserted into outer tube 13 and fastener 1 is positioned over the joining point. When knob 12 is turned clockwise manually or with a screw driver, pressure-exerting disc 11 gradually presses band 2 and extends it from support 5 as indicated by the dotted line in FIG. 4. Because both ends of band 2 are fixed to arms 7, 8 of support 5, the more band 2 is pushed away from support 5 by disc 11, the less reduction in the diameter of the coiled band. Therefore tube 13 is compressed along the entire circumference of band 2 without leaving any unpressed part along the circumference of the tube. Tube 13 is naturally fastened to inner tube 14 by squeezing pressure and, thus, leakage of gas or liquid from the joint is prevented.

Moreover, as arms 7, 8 of support 5 are bent slightly when band 2 is pushed downward by disc 11 (as shown by the dotted line in FIG. 4), the springing force caused by the strain of arms 7, 8 provides a continuing squeezing force to tube 13, which provides a more complete seal against leakage.

Another advantage of the invention is the location of knob 12 for manual adjustment. As shaft 10 is associated with support 5 in the radial direction of band 2, any type of knob 12 can be mounted on the outer end of screw shaft 10, and also the opposing walls or arms 7, 8 of support 5 do not obstruct the operation of knob 12.

In addition to the screw shaft, alternate force-exerting means, such as a plunger in combination with suitable locking means to maintain the pressure against the coils, can be used.

In addition to its function for connecting flexible hose or tubing, the fastener of the invention can be used as a hose clamp and for binding together a plurality of sticks or rods.

I claim:

1. A fastener comprising (a) at least one circularly coiled band in the form of a flexible wire and having terminal end portions oppositely extending beyond a coiled portion, (b) a support which holds said end portions in spaced apart relationship, and (c) pressure exerting means projecting through said support and positioned intermediate said end portions, said pressure exerting means being operatively associated with said band to force the coiled portion of said band away from said support.

2. The fastener of claim 1 in which the said support has two symmetrically projecting arms opposing each other and said oppositely extending end portions are separately fixed to each of said arms.

3. The fastener of claim 1 in which the pressure exerting means is adjustably mounted to the said support.

4. A fastener consisting of (a) at least one circularly coiled band in the form of a flexible wire and having terminal ends extending oppositely from at least one circular coil, (b) a support which holds said terminal ends in spaced apart relationship, (c) a screw shaft intermediate said ends piercing said support in the radial direction of said coil and engaging an inner screw thread positioned on said support; and (d) a pressure exerting disc provided at one end of the screw shaft and engaging the outer surface of said coil.

5. The fastener of claim 4 in which said disc is rotatably mounted on the screw shaft.

6. The fastener of claim 5 in which a knob is provided at the end of the screw shaft opposite to the end on which the disc is mounted.

7. The tube fastener of claim 6 in which the knob is a shape of a cylinder.

8. The tube fastener of claim 6 in which the knob is in the shape of a disc plate.

9. The tube fastener of claim 6 in which the knob is a shape of a wing.

10. The tube fastener of claim 6 in which the knob is a shape of a nut-head.

11. The tube fastener of claim 4 in which said coiled band comprises a plurality of coils.

* * * * *